(12) United States Patent
Huang et al.

(10) Patent No.: US 9,443,109 B2
(45) Date of Patent: Sep. 13, 2016

(54) COMPUTING DEVICE AND METHOD OF PROCESSING SECURE SERVICES FOR COMPUTING DEVICE

(71) Applicant: MStar Semiconductor, Inc., Hsinchu Hsien (TW)

(72) Inventors: Chien-Hsing Huang, Hsinchu (TW); Hsin-Hsiung Tseng, Hsinchu (TW)

(73) Assignee: MSTAR SEMICONDUCTOR, INC., Hsinchu Hsien (TW)

(*) Notice: Subject to any disclaimer, the term of this patent is extended or adjusted under 35 U.S.C. 154(b) by 20 days.

(21) Appl. No.: 14/692,909

(22) Filed: Apr. 22, 2015

(65) Prior Publication Data

US 2015/0302224 A1 Oct. 22, 2015

(30) Foreign Application Priority Data

Apr. 22, 2014 (TW) .............................. 103114507 A

(51) Int. Cl.
*G06F 21/74* (2013.01)

(52) U.S. Cl.
CPC ..................................... *G06F 21/74* (2013.01)

(58) Field of Classification Search
CPC ....................................................... G06F 21/74
See application file for complete search history.

(56) References Cited

U.S. PATENT DOCUMENTS

| | | | | | |
|---|---|---|---|---|---|
| 5,303,378 | A * | 4/1994 | Cohen | ................. | G06F 12/1491 710/264 |
| 5,642,509 | A * | 6/1997 | Ohshima | ............... | G06F 9/3879 715/835 |
| 6,708,273 | B1 * | 3/2004 | Ober | ........................ | G06F 8/60 713/189 |
| 7,631,309 | B2 * | 12/2009 | Wilt | ..................... | G06F 9/3851 710/52 |
| 8,494,576 | B1 * | 7/2013 | Bye | .................... | G07C 9/00087 455/403 |
| 2006/0259743 | A1* | 11/2006 | Suzuoki | .................. | G06F 1/206 712/220 |
| 2009/0013196 | A1* | 1/2009 | Ito | ........................ | H04L 9/3236 713/193 |
| 2012/0297202 | A1* | 11/2012 | Gallet | ................... | G06F 1/3203 713/189 |

* cited by examiner

*Primary Examiner* — Shawnchoy Rahman
(74) *Attorney, Agent, or Firm* — WPAT, PC; Justin King

(57) ABSTRACT

A method of processing secure services is provided. The method is applied to a processing unit of a computing device to control the processing unit to process multiple secure services. The computing device includes a storage unit. The method includes: controlling a core of the processing unit to perform following steps in a secure mode: accessing the storage unit to obtain a first command that includes first secure service information, processing a first secure service associated with the first secure service information according to the first command, and accessing the storage unit to obtain a second command that includes second secure service information. During a period from a time point that the core accesses the storage unit to obtain the first to a time point that the core accesses the second command, the core is controlled to stay in the secure mode.

15 Claims, 5 Drawing Sheets

COMPUTING DEVICE AND METHOD OF PROCESSING SECURE SERVICES FOR COMPUTING DEVICE

This application claims the benefit of Taiwan application Serial No. 103114507, filed Apr. 22, 2014, the subject matter of which is incorporated herein by reference.

BACKGROUND OF THE INVENTION

1. Field of the Invention

The invention relates in general to a computing device and a method of controlling a computing device to process secure services, and more particularly, to a computing device in which a core of a processing unit is capable of processing multiple secure services based on one-time mode conversion, and a method of controlling a computing device to process secure services.

2. Description of the Related Art

To increase the security level of systems, cores of many current processing units support operations in a trusted execution environment (TEE, to be referred to as a secure mode). An environment in contrast with the TEE is referred to as an open execution environment (also known as a rich execution environment, REE, to be referred to as a general mode). In the general mode, the core of the processing unit executes a normal operation system (normal OS) to process mostly user-related operations, e.g., Internet browsing, multimedia playing and application downloading. In the secure mode, the core of the processing unit executes a secure operation system (secure OS) to process system and data security-related operations, e.g., secure services such as digital right management (DRM) and online payments. When a secure service arises, the core of the processing unit switches from the general mode to the secure mode to process the secure service. In practice, the core enters the secure mode from the general mode according to a predetermined secure mode calling instruction. For example, the instruction may be a secure monitor call (SMC) instruction designed by ARM, or a safer mode extension (SMX) instruction designed by Intel. One secure service usually has one corresponding service identification (service ID). For example, when the SMC instruction notifies the core to process a secure service, the service ID corresponding to the secure service is also issued. The core processes the secure service according to the service ID after having entered the secure mode, and returns to the general mode after having processed the secure service.

FIG. 1 shows a schematic diagram of a core of a conventional processing unit during conversion between a general mode and a secure mode. When a core 130, in a general mode 110, learns that a first secure service (service ID: 001) is generated at a time point T1, the core 130 issues an SMC instruction (e.g., SMC: 001) carrying a service ID 001 to enter a secure mode 120 to process the first secure service, and returns to the general mode 110 after having processed the first secure service. At a time point T2, when the core 130 learns that a second secure service (service ID: 002) is generated, the core 130 issues an SMC instruction (e.g., SMC: 002) carrying a service ID 002 to enter the secure mode 120 to process the second secure service, and returns to the general mode 110 after having processed the second secure service. In the above design, the core 130 is limited by one restriction—the core 130 having entered the secure mode can only process one secure service. More specifically, even when the second secure service is generated while the first secure service is being processed, the core 130 needs to wait till the first secure service is completely executed, return to the general mode 110 and then issue the second SMC instruction in order to process the second secure service. The above limitation poses a great restriction on the core when the core executes the secure OS to undesirable affect the processing unit and even overall performance of a computing device using the processing unit.

SUMMARY OF THE INVENTION

In view of the drawbacks of the prior art, it is an object of the present invention to provide a computing device and a method of controlling a computing device to process secure services, so as to allow a core of the processing unit with better performance in a secure mode.

The present invention discloses a method of processing secure services applied to a processing unit of a computing device to control the processing unit to process multiple secure services. The computing device includes a storage unit. The method includes: controlling a core of the processing unit to perform following steps in a secure mode: accessing the storage unit to obtain a first command that includes first secure service information, processing a first secure service associated with the first secure service information according to the first command, and accessing the storage unit to obtain a second command that includes second secure service information. During a period from a time point that the core accesses the storage unit to obtain the first to a time point that the core accesses the storage unit to obtain the second command, the core is controlled to stay in the secure mode.

The present invention further discloses a computing device. The computing device comprises: a processing unit, comprising a core, the core in a general mode entering a secure mode according to a secure mode calling instruction; and a storage unit, coupled to the processing unit, storing a first command that includes first secure service information. In the secure mode, the core accesses the storage unit to obtain the first command, processes a first secure service associated with the first secure service information according to the first command, and accesses the storage unit to obtain a second command that includes second secure service information. During a period from a time point that the core accesses the storage unit to obtain the first to a time point that the core accesses the storage unit to obtain the second command, the core is controlled to stay in the secure mode The computing device and the method of controlling a computing device to process secure services allow a core of a processing unit to stay in the secure mode, and to only return to the general mode after having processed multiple secure services. Compared to the prior art, instead of being restricted by a secure OS for a long period of time, the core of the present invention is capable of flexibly processing multiple secure services in the secure mode. Further, with the present invention, a time slice mechanism may be designed in a secure OS to provide the secure OS with a multi-thread function to enhance the performance of the core in the secure mode.

The above and other aspects of the invention will become better understood with regard to the following detailed description of the preferred but non-limiting embodiments. The following description is made with reference to the accompanying drawings.

DETAILED DESCRIPTION OF THE INVENTION

Technical terms of the application are based on the general definition in the technical field of the application. If the application describes or explains one or some terms, definitions of the terms are based on the description or explanation of the application.

The present invention discloses a computing device and a method of controlling a computing device to process secure services, so as to allow a core in a secure mode to process multiple secure services. The device and method are applicable to a processing unit having a secure mode and a general mode. In possible implementation, one skilled person in the art may choose equivalent devices or steps to implement the disclosure based on the disclosure of the application. That is, the implementation of the disclosure is not limited in the embodiments described in the disclosure. Further, a part of the elements included in the computing device of the disclosure may be individually known. Without affecting the full disclosure and possible implementation of the computing device, the known details are omitted. Further, the method of controlling a computing device to process secure services of the present invention may be implemented by the computing device of the disclosure or an equivalent device. Without affecting full disclosure and possible implementation of the method, details of the method focus on steps instead of hardware.

Figure 1:
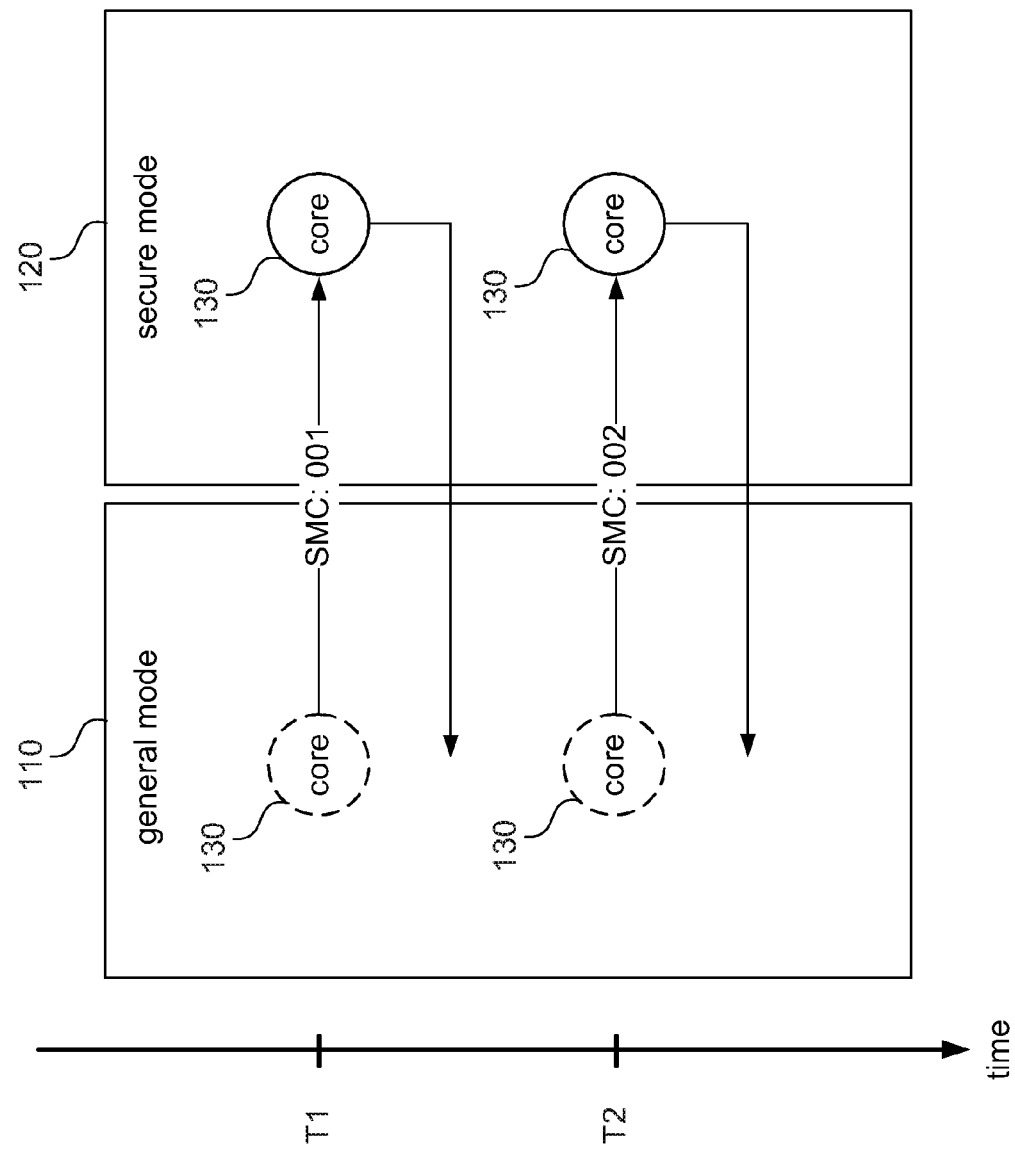
FIG. 1 is a schematic diagram of a core of a conventional processing unit during conversion between a general mode and a secure mode in order to process a secure service.
Figure 2:
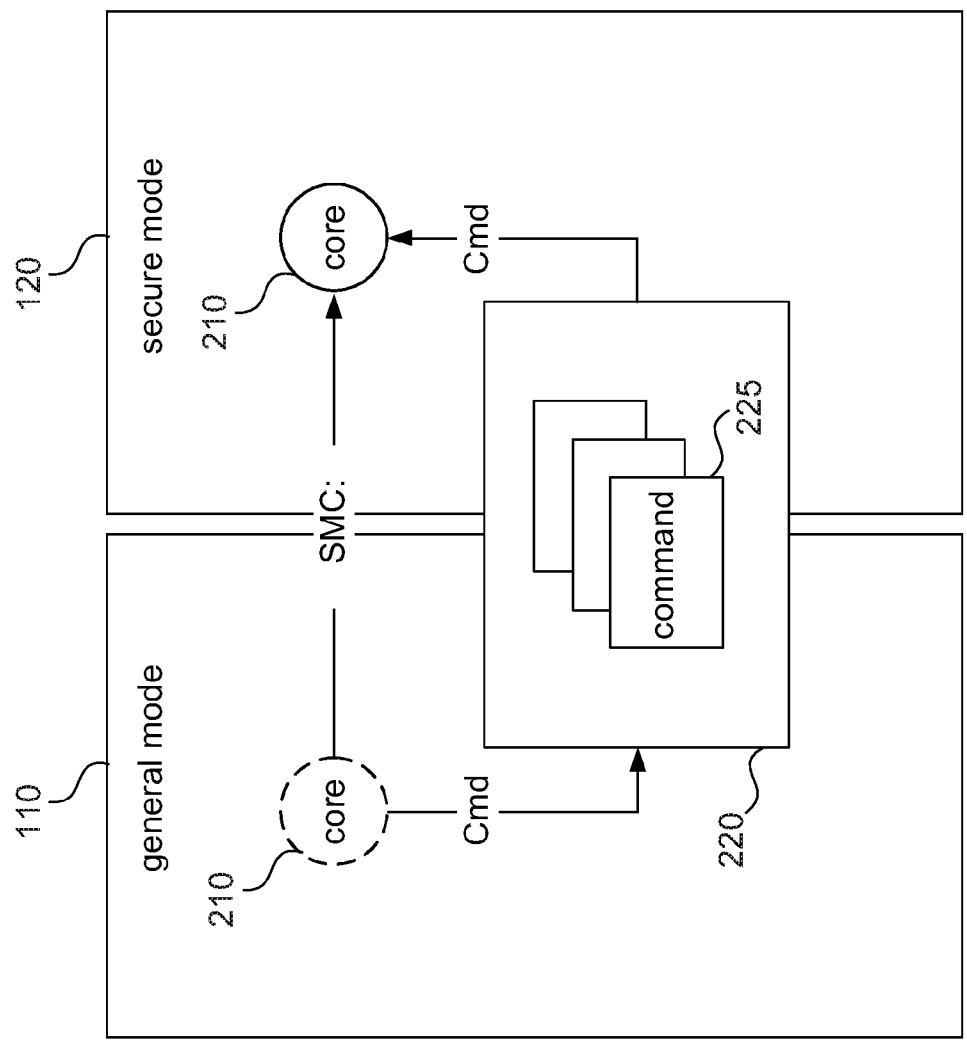
FIG. 2 is a schematic diagram of a core of a computing device during conversion between a general mode and a secure mode in order to process secure services according to an embodiment of the present invention.
Figure 3:
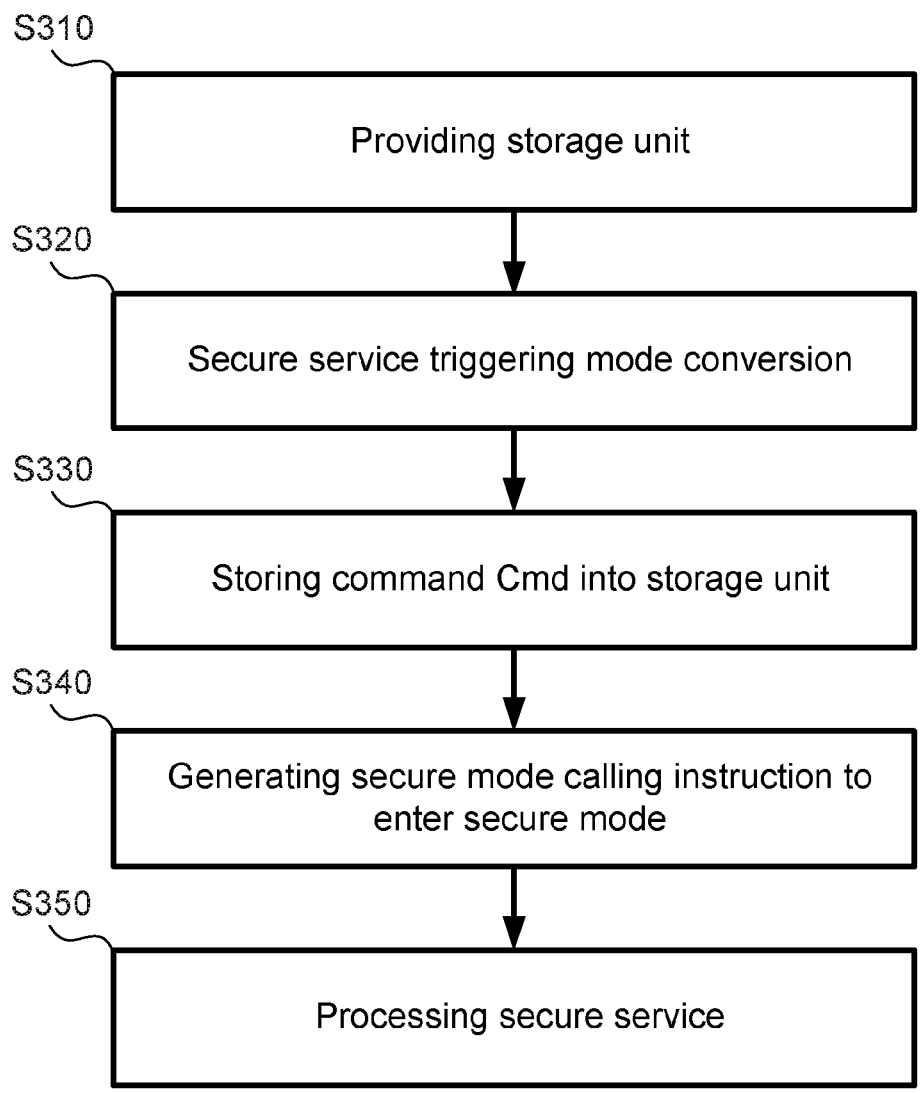
FIG. 3 is a schematic diagram of a method of controlling a computing device to process secure services according to an embodiment of the present invention.

FIG. 2 shows a schematic diagram of a core of a computing device during a conversion between a general mode and a secure mode to process secure services according to an embodiment of the present invention. The computing device of the present invention may be a consumer electronic product, e.g., a computing device having data process and computation capabilities, such as a television, a cell phone or a multimedia player. These devices usually include a processing unit and a storage unit. The processing unit at least includes a core 210. The core 210 is operable in a general mode 110 and a secure mode 120, and is adapted to access a storage unit 220 in the general mode 110 and in the secure mode 120. For example, the storage unit 220 may be a certain section of a system memory of the computing device, or a certain hardware register. FIG. 3 shows a schematic diagram of a method of controlling a computing device to process secure services according to an embodiment of the present invention. After the storage unit 220 is provided (step S310), when a secure service is generated, the secure service triggers the core 210 capable of processing the secure service to converse the mode (step S320). Before the core 210 enters the secure mode 120 (indicated by dotted lines in FIG. 2), a command (Cmd) associated with the secure service, e.g., a command including a service ID, is stored into the storage unit 220 (step S330), and a secure mode calling instruction (e.g., an SMC instruction designed by ARM) is generated. According to the instruction, the core 210 enters the secure mode 120 (step S340). It should be noted that, compared to the prior art, as the service ID is previously stored into the storage unit 220 in step S330, the secure mode calling function need not carry the service ID of the secure service. After having entered the secure mode, the core 210 reads the command 225 from the storage unit 220, and processes the secure service according to the service ID included in the command 225 (step S350). In general, the secure service has a priority level higher than those of other services. Thus, after the core 210 completes processing the current secure service, if the storage unit 220 further includes other command 225, the core 210 completes processing all the secure services associated with the other commands 225 in the storage unit 220, and then returns to the general mode 110. That is to say, as the core 210 enters the secure mode and processes the secure service, before returning to the general mode 110, the core 210 first checks whether there are other commands in the storage unit 220. For example, the core 210 checks the storage unit 220 by a polling method at a predetermined interval, and only returns to the general mode 110 when it is ascertained that there are no other secure services to be processed. The other commands may be other commands associated with secure services, and may be stored into the storage unit 220 before the core 210 processes the current secure service or may be stored into the storage unit 220 as the core 210 begins processing the current secure service.

Figure 4:
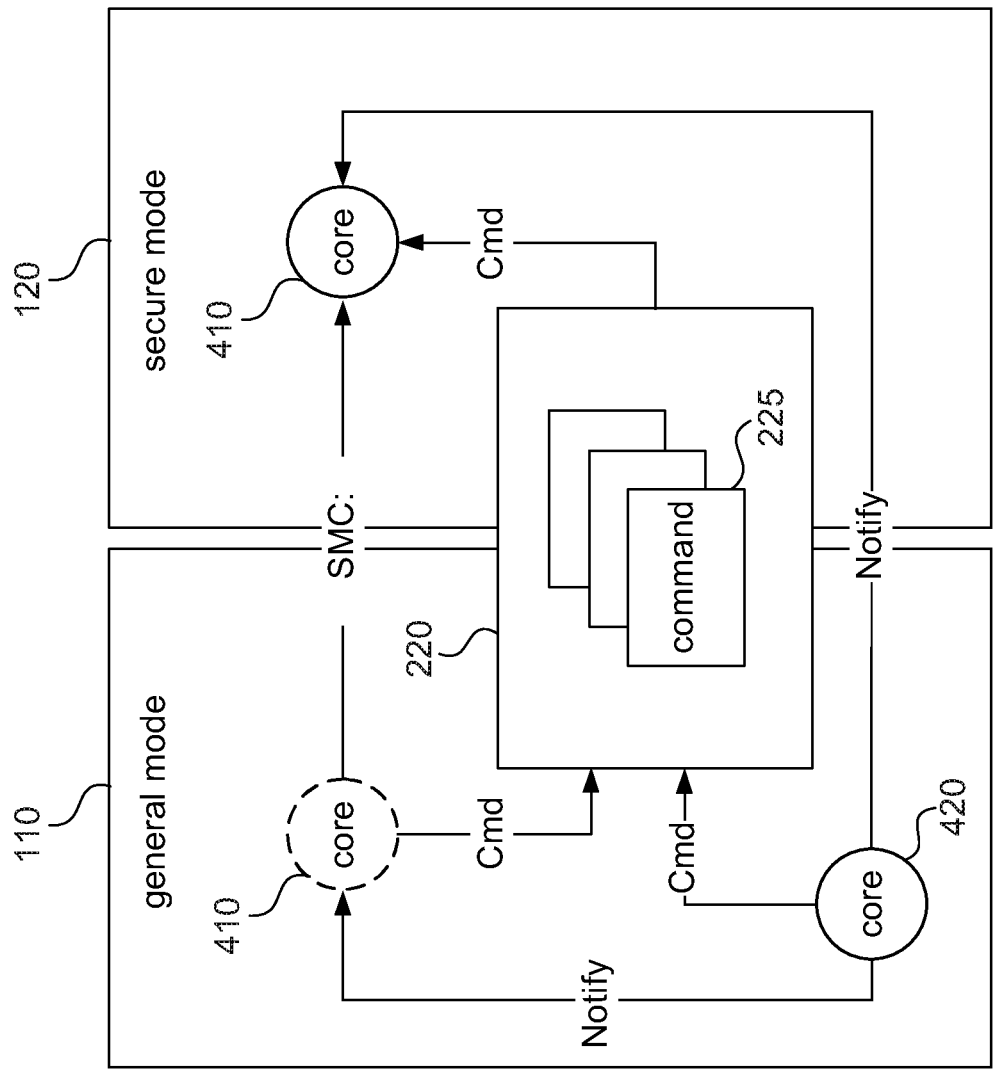
FIG. 4 is a schematic diagram of a core of a computing device during conversion between a general mode and a secure mode in order to process secure services according to another embodiment of the present invention.
Figure 5:
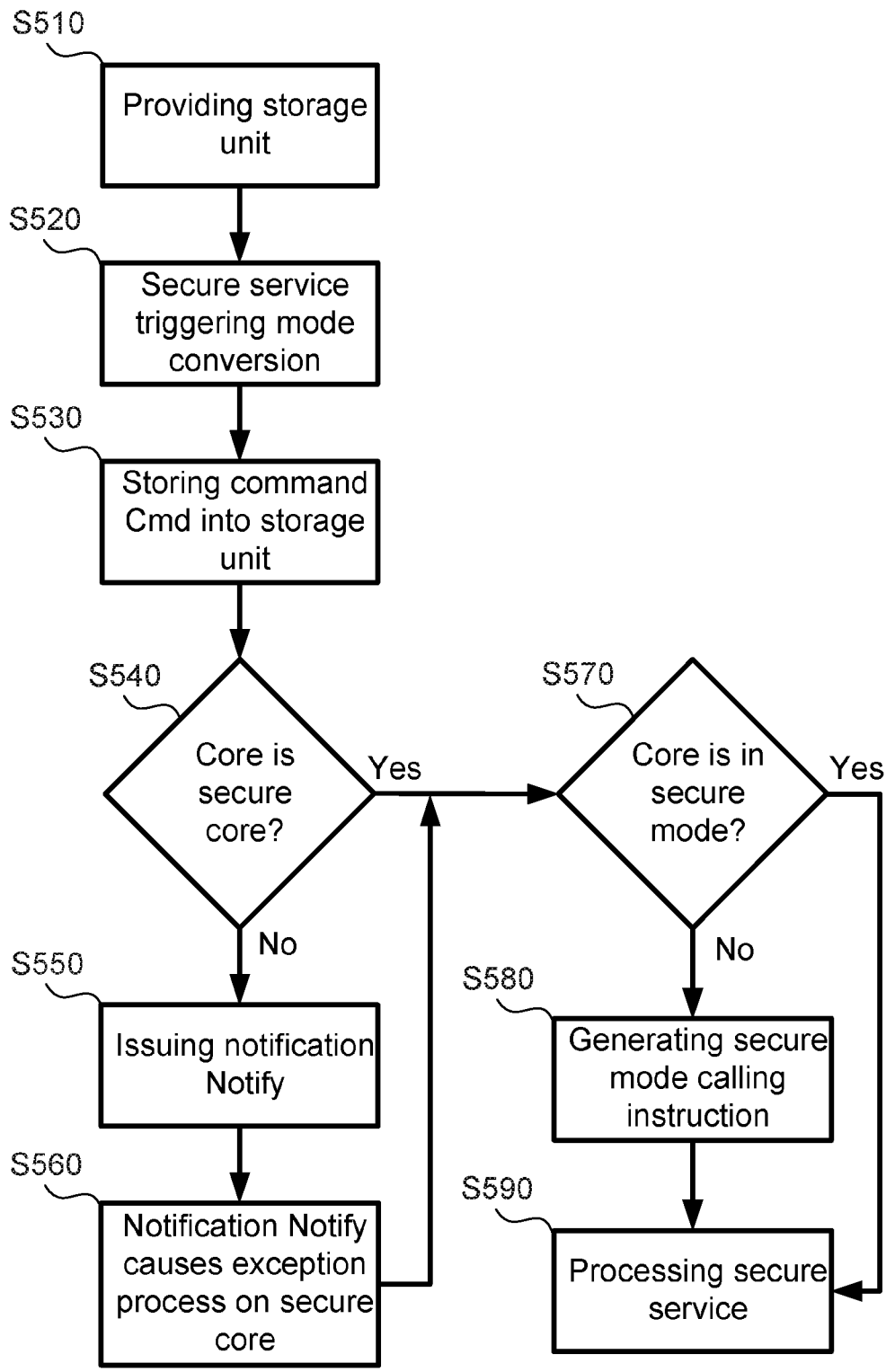
FIG. 5 is a schematic diagram of a method of controlling a computing device to process secure services according to another embodiment of the present invention.

FIG. 4 shows a schematic diagram of a core of a computing device during conversion between a general mode and a secure mode in order to process a secure service according to another embodiment of the present invention. As functions of the processing unit expand, the number of cores provided also increases. When the processing unit includes two or more cores, at least one of the cores is designed as a secure core. Only the secure core is able to enter a secure mode to process secure services, whereas the remaining cores stay in a general mode to process other services. In the embodiment in FIG. 4, the processing unit of the computing device includes two cores—a core 410 and a core 420. The core 410 is a secure core, and is adapted to enter a secure mode when triggered by a secure mode calling instruction. The core 420 is a non-secure core, or referred to as a general core. In other embodiments, the processing unit of the computing device may include more cores, e.g., four cores, and the number of secure cores is not limited to one, e.g., two of the four cores are designed as secure cores. FIG. 5 shows a schematic diagram of a method of controlling a computing device to process secure services according to another embodiment of the present invention. Same as that in the previous embodiment, a storage unit 220 for storing a command including a secure ID is first provided (step S510). When a secure service is generated, the secure service triggers the core 410 to converse the mode (step S520). However, this secure service may be received by the secure core 410 or the non-secure core 420. Whether the secure core 410 or the non-secure core 420 receives the secure service event, the command 225 associated with the secure service, e.g., the command including the service ID, is stored into the storage unit 220 (step S530). It is then determined whether the core that receives the secure service event is the secure core (step S540). If the core 420 receives the secure service event, as the core 420 is not the secure core, a notification (Notify) is issued to inform the core 410 to process the secure service (step S550). The core 410 generates an exception process (exception) due to the notification (Notify) (step S560). This exception process causes the core 410 to enter the secure mode 120. However, if the above secure service event is received by the core 410, a determination result of step S540 is affirmative such that step S570 is directly performed. In step S570, the core 410 determines whether it is in the secure mode 120. If the core 410 is not in the secure mode 120, the core 410 generates a secure mode calling instruction (step S580), according to which the core 410 enters the secure mode 120 to process the secure service (step S590). That is, the core 410 reads the command 225 from the storage unit 220, and processes the associated secure service according to the command 225. When a determination result of step S570 is affirmative, i.e., when the core 410 is already in the secure mode 120 while the exception process is generated (indicating that the core 410 is currently processing another secure service), without exiting the secure mode 120 and again entering the secure mode 120, the core 410 may immediately process the secure service after having processed the current secure service (step S590).

For example, the above storage unit may be a certain section of the system memory of the computing device or a certain hardware register, and the core may access either of the two in both the general mode 110 and the secure mode 120. The notification (Notify) in step S550 may be a software generated interrupt (SGI) or a hardware generated interrupt. For example, the hardware interrupt is a mailbox interrupt mechanism, under which the core 420 in the general mode 110 writes the command 225 to the hardware register and sends the interrupt to inform the core 410 of a new command generated in the hardware register.

It should be noted that, when the core 410 in the secure mode 120 processes the secure service, if a new secure service is generated at this point, the core 420 will receive this secure service event. Accordingly, the core 420 stores a command associated with the secure service into the storage unit 220 (step S530), and issues the notification (Notify) to inform the core 410 (step S550 and step S560). According to the notification (Notify) from the core 420, the core 410 learns that a new command 225 is generated in the storage unit 220. Thus, rather than immediately returning to the general mode 110 after having processed the current secure service, the core 410 accesses the storage unit 220 to obtain the new command 225 according to the above notification, and processes the new secure service associated with the new command. In other words, in the architecture of the embodiment, unlike the prior art in which a next secure service cannot be issued because the secure core 410 in the secure mode 120 is currently processing a secure service, in the present invention, the core 410 is capable of processing an interrupt issued by the core 420 after the core 410 enters the secure mode. Therefore, the core 410 in the secure mode 120 is still capable of receiving notifications (Notify) corresponding to different secure services, and consecutively processing more than one secure service. For example, when core 420 continuously stores commands 225 into the storage unit 220 while the core 410 is in the secure mode 120, the core 410 is capable of continuously processing newly happened secure services. That is, in one period during which the core 410 enters the secure mode 120, the core 410 is capable of processing more than one secure service, so as to provide greater flexibilities when the core 410 executes a secure OS.

Further, through a time slice mechanism, the present invention allows a secure OS to support multi-thread scheduling. When the design of multi-thread scheduling is available, the core 410 may first return to the general mode 110 as the time slice ends even if the secure service is not yet completely processed. For example, when the core 410 processes a secure service, data needs to be moved through a direct memory access (DMA) unit. When the DMA unit starts operating after the command is issued, if the task of the DMA unit is not yet complete as the time slice ends and there are no other commands to be processed in the storage unit 220, the core 410 at this point first returns to the general mode 110 to support processing other services in order to prevent wasting time in the secure mode 120. After the DMA unit completes the task, the core (the core 410 or the core 420) in the general mode 110 is informed. Steps 570 to S590 are preformed if the core 410 receives the notification, or else steps S550 to S590 are performed if the core 420 receives the notification. That is to say, without wasting computing resources on waiting, the core 410 may flexibly convert between the general mode 110 and the secure mode 120 during the course of processing the secure service, thereby providing operations of the entire processing unit with better efficiency. In a preferred embodiment, if the secure OS is given a time slice design, as the time slice ends, the core 410 first verifies whether a command to be processed is stored in the storage unit 220. If so, the core 410 stays in the secure mode 120 to process the secure service; if the storage unit 220 is empty, the core 410 returns to the general mode 110.

In another embodiment, the secure core 410 does not enter the secure mode 120 from the general mode 110 according to the notification from the core 420. Alternatively, a predetermined period (e.g., a time slice) is set, and the core 410 initiatively issues a secure mode calling instruction when the predetermined period is reached to prompt itself to enter the secure mode 120. Thus, the core 410 may periodically enter the secure mode 120 to check whether there is a newly generated secure service. In a preferred embodiment, the above method may be implemented in parallel with the notification. That is to say, in addition to periodically entering the secure mode 120 to check whether there is a newly generated secure service, the core 410 may also enter the secure mode 120 to check whether there is a newly generated secure service through the notification from the other core 420.

One person skilled in the art can understand implementation details and variations of the method in FIG. 3 and FIG. 5 from the disclosure of the device in FIG. 2 and FIG. 4. Without affecting full disclosure and implementation of the method of the present invention, repetitive details are omitted herein. It should be noted that, the shapes, sizes, ratios and sequences of the steps in the drawings are examples for explaining the present invention to one person skilled in the art, not limiting the present invention. In possible implementation, one skilled person in the art would selectively implement part or all technical features of any embodiment of the application or selectively combine part or all technical features of the embodiments of the application based on the disclosure of the present invention to enhance the implementation flexibility of the present invention.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of processing secure services, applied to a processing unit of a computing device to control the processing unit to process multiple secure services, the computing device comprises a storage unit, the method comprising:
controlling a core of the processing unit to perform following steps in a secure mode:
accessing the storage unit to obtain a first command that comprises first secure service information;
processing a first secure service associated with the first secure service information according to the first command; and
accessing the storage unit to obtain a second command that comprises second secure service information, comprising:
storing the second command into the storage unit;
issuing a notification to the core which is in the secure mode;
controlling the core to access the storage unit according to the notification to obtain the second command; and
processing a second secure service associated with the second secure service information according to the second command;
wherein, during a period from a time point that the core accesses the storage unit to obtain the first command to a time point that the core accesses the storage unit to obtain the second command, controlling the core to stay in the secure mode.

2. The method according to claim 1, wherein the notification is one of a software generated interrupt and a hardware generated interrupt.

3. The method according to claim 1, wherein the core in the secure mode accesses another command in the storage unit according to a predetermined period.

4. The method according to claim 1, further comprising:
controlling the core to stay in a general mode for a predetermined period and then to enter the secure mode.

5. The method according to claim 1, further comprising:
controlling the core to enter the secure mode from a general mode according to a notification;
wherein, the notification is in response to storing the first command into the storage unit.

6. The method according to claim 1, further comprising:
generating a secure mode calling instruction; and
controlling the core to enter the secure mode from a general mode according to the secure mode calling instruction;
wherein, the secure mode calling instruction excludes the first secure service information.

7. The method according to claim 1, wherein the step of controlling the core to perform following steps further comprises:
scheduling the commands in the storage unit, and executing the commands by multi-threading.

8. The method according to claim 1, further comprising:
when the core stays in the secure mode for a predetermined period and there is no command in the storage unit, controlling the core to exit the secure mode and to enter a general mode.

9. A computing device, comprising:
a processing unit, comprising a first core, the first core in a general mode entering a secure mode according to a secure mode calling instruction; and
a storage unit, coupled to the processing unit, storing a first command that comprises first secure service information;
wherein, the first core in the secure mode accesses the storage unit to obtain the first command, processes a first secure service associated with the first secure service information, and accesses the storage unit to obtain a second command that comprises second secure service information; during a period from a time point that the first core accesses the storage unit to obtain the first command to a time point that the first core accesses the storage unit to obtain the second command, the first core is controlled to stay in the secure mode;
wherein the processing unit further comprises a second core, the second core in the general mode stores the second command into the storage unit and issues a notification to inform the first core to access the storage unit to obtain the second command; and
wherein the first core processes the second secure service associated with the second secure service information according to the second command.

10. The computing device according to claim 9, wherein the secure mode calling instruction excludes the first secure service information.

11. The computing device according to claim 9, wherein the first core in the general mode enters the secure mode from the general mode according to the notification.

12. The computing device according to claim 9, wherein the first core in the secure mode accesses another command in the storage unit according to a predetermined period.

13. The computing device according to claim 9, wherein the first core in the general mode enters the secure mode after staying in the general mode for a predetermined period.

14. The computing device according to claim 9, wherein the first core schedules the commands in the storage unit, and executes the commands by multi-threading.

15. The computing device according to claim 9, wherein when the first core stays in the secure mode for a predetermined period and there is no command in the storage unit, the first core exits the secure mode and enters the general mode.

* * * * *